(12) United States Patent
Jung

(10) Patent No.: US 11,052,616 B2
(45) Date of Patent: Jul. 6, 2021

(54) METHOD AND TOOL SYSTEM FOR MANUFACTURING A MULTILAYER FIBER STRUCTURE

(71) Applicant: AIRBUS OPERATIONS GMBH, Hamburg (DE)

(72) Inventor: Manuel Jung, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 669 days.

(21) Appl. No.: 15/817,734

(22) Filed: Nov. 20, 2017

(65) Prior Publication Data

US 2018/0141288 A1      May 24, 2018

(30) Foreign Application Priority Data

Nov. 22, 2016   (EP) .................................... 16200029

(51) Int. Cl.
   *B29C 70/30*        (2006.01)
   *B29C 70/38*        (2006.01)
   *B32B 5/26*         (2006.01)

(52) U.S. Cl.
   CPC .............. *B29C 70/386* (2013.01); *B32B 5/26* (2013.01); *B32B 2250/20* (2013.01); *B32B 2605/18* (2013.01)

(58) Field of Classification Search
   CPC ..... B29C 33/485; B29C 53/42; B29C 70/446; B29C 70/462; B29C 70/541; B29C 70/543; B29C 70/56; B29C 70/386
   See application file for complete search history.

(56) References Cited

U.S. PATENT DOCUMENTS

| 2,797,179 | A | * | 6/1957 | Kress | ..................... | B29C 70/28 |
| | | | | | | 264/257 |
| 3,726,953 | A | * | 4/1973 | Jones | ..................... | B29C 51/06 |
| | | | | | | 264/547 |

(Continued)

FOREIGN PATENT DOCUMENTS

| CN | 108081632 B | 6/2020 |
| EP | 0154321 A1 | 9/1985 |

(Continued)

OTHER PUBLICATIONS

European Search Report for Application No. 16200029.3 dated Jun. 9, 2017.

(Continued)

*Primary Examiner* — Matthew J Daniels
(74) *Attorney, Agent, or Firm* — Jenkins, Wilson, Taylor & Hunt, P.A.

(57) ABSTRACT

A method for manufacturing a multilayer fiber structure includes providing a receiving surface being formed by a first surface region of a contoured tool surface of a forming tool component and a support surface of a support component. Further, at least one fiber layer is formed on the receiving surface by laying down a plurality of fiber tapes onto the receiving surface. A roller device is positioned so as to press the at least one fiber layer against the tool surface and the support component and the roller device are synchronously moved along a curved transition region connects the first surface region to a second surface region of the tool surface. Thereby the at least one fiber layer is abutted against the transition region and the second surface region of the tool surface. Further, a tool system for manufacturing a multilayer fiber structure is disclosed.

5 Claims, 3 Drawing Sheets

(56) References Cited

U.S. PATENT DOCUMENTS

| | | | | |
|---|---|---|---|---|
| 4,292,108 A | * | 9/1981 | Weiss | B29C 70/388 |
| | | | | 156/259 |
| 4,990,213 A | | 2/1991 | Brown et al. | |
| 5,648,109 A | * | 7/1997 | Gutowski | B29C 51/085 |
| | | | | 156/212 |
| 6,114,012 A | * | 9/2000 | Amaoka | B29C 70/30 |
| | | | | 244/119 |
| 6,814,916 B2 | * | 11/2004 | Willden | B29C 43/12 |
| | | | | 264/257 |
| 2006/0249883 A1 | * | 11/2006 | Oguma | B29C 70/44 |
| | | | | 264/339 |
| 2009/0091063 A1 | * | 4/2009 | Petersson | B29C 70/44 |
| | | | | 264/320 |
| 2009/0261199 A1 | | 10/2009 | McCarville et al. | |
| 2016/0207266 A1 | * | 7/2016 | Koncz | B29C 70/02 |

FOREIGN PATENT DOCUMENTS

| | | |
|---|---|---|
| EP | 1878563 A1 | 1/2008 |
| FR | 2934807 A1 | 2/2010 |

OTHER PUBLICATIONS

Chinese Office Action for Application No. 201710844677.7 dated Aug. 5, 2019.

* cited by examiner

… … …

METHOD AND TOOL SYSTEM FOR MANUFACTURING A MULTILAYER FIBER STRUCTURE

CROSS-REFERENCE TO RELATED APPLICATION

This application claims priority to European Patent Application EP 16 200 029.3 filed Nov. 22, 2016, the entire disclosure of which is incorporated by reference herein.

TECHNICAL FIELD

The present disclosure pertains to a method and a tool system for manufacturing a multilayer fiber structure.

BACKGROUND

Fiber compound materials usually comprise multiple fiber layers which are embedded in or infiltrated by a matrix material. Fiber compound components made of fiber compound material typically comprise high mechanical strength compared to their specific weight. For that reason, structural parts for vehicles, in particular for aircrafts, are increasingly produced from fiber compound materials.

Typical methods for manufacturing fiber compound components comprise forming a multilayer fiber structure from dry or pre-impregnated fiber tapes. In case that dry fiber tapes are used, the multilayer fiber structure is infiltrated with matrix material or matrix material is generally applied to the multilayer fiber structure. Finally, curing of the fiber material is performed.

The multilayer fiber structure usually is formed layer wise by an automated fiber placement, AFP, process. For forming one layer, multiple fiber tapes are laid down by a deposition device neighbored to each other on a tool surface or an underlying layer of fiber tapes. The tool surface may either comprise an even shape or a contoured shape corresponding to the desired shape of the fiber compound component which is to be manufactured. In the first case, the multilayer fiber structure may be formed to the desired shape subsequently to the AFP process. In the second case, the deposition device is guided along the contoured surface.

The document US 2009/0261199 A1 discloses a method for forming complex shaped, in particular curved fiber compound components such as frame structures for use in an aircraft. The method comprises forming a flat ply stack by an AFP process. The ply stack is then disposed on an upper flat surface of a tool such that the ply extends past an edge which is formed by the upper flat surface and a contoured surface. A layup shelf supports the region of the ply stack that extends past the contoured surface. For forming the ply stack to the desired shape, the layup shelf is removed, and the ply stack is bent about the edge by a vacuum forming process.

SUMMARY

It is an idea of the present disclosure to provide an improved method and tool system for manufacturing multilayer fiber structures.

According to a first aspect of the disclosure herein, a method for manufacturing a multilayer fiber structure is provided. The method comprises providing a receiving surface being formed by a first surface region of a contoured tool surface of a forming tool component and a support surface of a support component. The first surface region of the tool surface is connected to a second surface region of the tool surface by a curved transition region. A front end region of the support surface of the support component extends along an end section of the first surface region of the tool surface lying adjacent to the transition region.

In particular, the second surface region may extend transversal (transverse) or inclined with respect to the first surface region. Further, the first and the second surface regions may face away from each other. The first surface region may in particular comprise an even or flat or only slightly curved areal expanse. The end section of the first surface region of the tool surface may be defined as a portion of the first surface that extends from the transition region over a predetermined width, for example over a width of 1 percent to 10 percent of the overall width of the first surface section. The support surface of the support part may in particular comprise an even or flat or only slightly curved areal expanse. The front end region of the support surface of the support part extends from a front or leading edge of the support component. That is, when the receiving surface is provided, the support component is positioned relative to the forming tool component such that the leading edge of the support part is positioned adjacent to or in a predefined distance to the end section of the first surface region of the tool surface and hence overlaps with the transition region. By this way of positioning the support surface of the support part relative to the first surface region of the tool surface, the support surface spans over or bridges the curved transition region.

The method further comprises forming at least one fiber layer by laying down a plurality of fiber tapes adjacent to one another or overlapping one another on the receiving surface. In particular, one fiber layer is formed by a plurality of longitudinally extending fiber tapes which are placed adjacent side by side to one another or which are placed so as to overlap one another in a direction transversal to their longitudinal extension. A first fiber layer is laid down onto the receiving surface. One or more further fiber layers may be laid down onto the first fiber layer.

Since the support surface spans over or bridges the curved transition region, the fiber tapes may be laid down with high velocity, for example by an automatic fiber placement, AFP, process. In particular, a device for laying down or deposing the fiber tapes may be moved over the receiving surface with increased velocity compared to directly placing the fiber tapes onto the curved transition region. Thus, the method according to the disclosure herein comprises an improved efficiency.

The method further comprises positioning a roller device in the end section of the first surface region of the tool surface so as to press the at least one fiber layer against the tool surface. The roller device in particular may comprise one or more rollers and presses the one or more fiber layers against the tool surface, in particular along a whole longitudinal expanse of the end section of the first surface region of the tool surface. Relative to the support component, the roller device hence is positioned such that the roller device extends along the front edge of the support component.

In a further step of the method, synchronously moving the front end region of the support surface of the support component and the roller device along the transition region and the second surface region of the tool surface is performed. Thereby, the at least one fiber layer is abutted against the transition region and the second surface region of the tool surface. Accordingly, the front edge of the support component is guided along the contour defined by the transition region and the second surface region. Synchronously to moving the support component, the roller device is guided along the contour defined by the transition region and the second surface region. Thereby, the at least one fiber layer is progressively drawn from the support surface and abutted onto the transition region and the second surface region by the roller device. Hence, the at least one fiber layer is transferred from the support surface to tool surface and formed to a shape corresponding to the tool surface.

By progressively abutting the at least one fiber layer to the curved transition region by the roller device while a remaining portion of the fiber layer is still supported by the support component, air pockets within the one or more fiber layers are reliably removed. Further, wrinkles or tucks are avoided and the one or more fiber layers are forced to the shape defined by the tool surface in an improved manner. Accordingly, a multilayer fiber structure of complex shape can be manufactured with improved quality by the method according to the disclosure herein.

The curved transition region may comprise a convex or concave curvature. It is also possible to provide the transition region with corrugated shape. In case that one or both of the first and second surface regions of the tool surface comprise a non-even shape, the transition region in particular may comprise a curvature with radii of curvature which are smaller or equal than 10 percent of a minimum radius of curvature the first or second surface region.

According to an embodiment of the method, the front end region of the support surface of the support component and the end section of the first surface region of the tool surface may confine an angle in the range between 150 degree and 210 degree in the step of providing the receiving surface. In particular, the angle may for example be measured between a tangent to the front end region of the support surface of the support component and a tangent to the end section of the first surface region of the tool surface. In this range of the angle, the fiber tapes can be placed easily placed in an efficient manner, for example by an AFP process.

According to an embodiment of the method, the front end region of the support surface of the support component and the end section of the first surface region of the tool surface may be positioned in a common plane in the step of providing the receiving surface. In particular, the front end region of the support surface of the support component and the end section of the first surface region of the tool surface may form a plane. Thereby, a rate of laying down the fiber tapes may be further increased. Further, wrinkles or dents in the surface tapes can vastly be avoided.

According to an embodiment of the method, the support component is tilted towards the second surface region of the tool surface while moving the front end region of the support surface along the transition region of the tool surface. In particular, the front edge of the support component is guided along the transition region and the second surface region of the tool surface and synchronously the support component is pivoted about its front edge. Thereby, sharp bending or kinks of the at least one surface layer during transfer to the tool surface can be reliably avoided.

In particular, the support component may be tilted such that an angle greater or equal than 100 degree is confined between the front end region of the support surface and an actual surface section of the tool surface to which the front end region of the support surface lies adjacent to while moving the front end region of the support surface along the transition region and the second surface region of the tool surface. The actual surface section may be defined as a virtual line or stripe of the tool surface which lies in a shortest possible distance to the front edge of the support component. By tilting the support surface to an angle greater than 100 degree relative to the actual surface section of the tool surface, sharp bending or kinks of the at least one surface layer during transfer to the tool surface can be avoided in a very reliable manner. Further, collapse of fibers of the fiber tapes is reliably avoided in this range of angles. The angle may further be less than 180°.

According to an embodiment of the method, for forming the at least one fiber layer the fiber tapes are laid down in the form of dry fiber tapes or pre impregnated fiber tapes. Generally, the fiber tapes are formed from a fiber material. Dry fiber tapes are formed as cloth, knits or similar structure formed by a plurality of fibers and comprising an areal, in particular longitudinal expanse, wherein the fibers of the cloth, knit or similar structure may be adhesively bonded to one another by a binder material. Pre-impregnated fiber tapes, so called pre-pregs, are formed as cloth, knits or similar structure formed by a plurality of fibers and comprising an areal, in particular longitudinal expanse, wherein the cloth, knit or similar structure is impregnated with an uncured matrix material, for example a duroplastic or thermoplastic resin material.

According to an embodiment of the method, the fiber tapes are laid down in an automated fiber placement, AFP, process. For example a fiber placement device may be provided which is configured to depose one or more fiber tapes onto the receiving surface or a fiber layer already disposed on the receiving surface. The fiber tapes may in particular by laid down progressively along their longitudinal expanse. AFP processes includes the benefit that a high amount of material can automatically be laid down with high accuracy. Providing the receiving surface with the support part which bridges the curved transition section of the tool surface allows to perform the AFP process with increased deposition rates.

According to a further aspect of the disclosure herein, a tool system for manufacturing a multilayer fiber structure is provided. The tool system may in particular be configured to perform a method according to one of the embodiments described above. Therefore, features and advantages disclosed in connection with the method are valid for the tool system in an analogous manner and vice versa.

The tool system comprises a forming tool component comprising a contoured tool surface which includes a first surface region and a second surface region, wherein the first surface region is connected to the second surface region by a curved transition region. In particular, the second surface region may extend transversal or inclined with respect to the first surface region. Further, the first and the second surface regions may face away from each other, that is an angle greater than 180 degree is confined between the first and the second surface region. The first surface region and/or the second surface region may in particular comprise an even or flat or only slightly curved areal expanse. The end section of the first surface region of the tool surface may be defined as a portion of the first surface that extends from the transition region over a predetermined width, for example over a width of 1 percent to 10 percent of the overall width of the first surface section.

The tool system further comprises a support component comprising a support surface and a roller device. The support component is movable along the tool surface of the forming tool component by a first moving device between a starting position, in which a front end region of the support surface of the support component extends along an end section of the first surface region of the tool surface lying adjacent to the transition region, and an end position in which the front end region of the support surface of the support component extends along the second surface region of the tool surface. Hence, in the starting position, a front edge or leading edge of the support component faces towards the forming tool component and is positioned such that it extends along the end section of the first surface region of the tool surface. In particular, the support surface spans over or bridges the curved transition region in the starting position. Further, a receiving surface for receiving fiber tapes for forming a fiber layer is formed by the support surface and the first surface region of the tool surface. In the end position, the front edge of the support part faces the second surface region of the tool surface. The second moving device, which may for example be a manipulator of a robot or similar, is configured to guide the support part between the starting position and the end position. In particular, the front edge of the support part is guidable along the transition region and the second surface region of the tool surface.

The roller device by a second moving device is positionable in a predefined distance to the tool surface and movable along the tool surface synchronously with the support component. The predefined distance may be chosen such that one or more fiber layers disposed on the receiving surface may be pressed against the tool surface by the roller device. The roller device in particular is movable such that it is kept in a predefined distance to the front edge of the support part.

Since the support surface spans over or bridges the curved transition region in the starting position of the support surface, a receiving surface comprising a planar or only slightly curved shape is provided. Thereby, fiber tapes may be laid down with high velocity to the receiving surface, for example by an automatic fiber placement, AFP, process. In particular, a device for laying down or deposing the fiber tapes may be moved over the receiving surface with increased velocity compared to directly placing the fiber tapes onto the curved transition region. In particular, one or more fiber layers may be formed completely on a surface which allows efficient deposition of fiber tapes first and then be commonly transferred from the support component to the curved transition region and the second surface region of the tool surface by moving the support part and the roller along the curved transition region and the second surface region of the tool surface. As described above, quality of a fiber structure is thereby improved.

According to an embodiment of the tool system, the roller device comprises a plurality of rollers arranged adjacent to one another. In particular, the plurality of rollers are arranged such that axes of rotations of the rollers extend along each other, and in particular such that the axes of rotations of the rollers are congruent. By providing a plurality of rollers, individual pressure forces can be achieved along the longitudinal expanse of the roller device.

According to an embodiment of the tool system, the support component comprises a wedge-shaped front section including the front end region of the support surface. A wedge-shaped or tapered shape of the front section, in particular a front section of the support part having a wedge-shaped cross-section provides the benefit that the front edge may be positioned very close to the end section of the first surface region in the starting position without contacting the transition region of the tool surface. Thereby, a gap between the front edge of the support part and the end section of the first surface region of the tool part may be held very small. Thereby, formation of dents in fiber tapes when being placed on the receiving surface may mostly be avoided or at least kept small.

According to an embodiment of the tool system, the support surface is planar. In particular, the support surface may comprise an even or flat areal expanse. Thereby, maximum deposition rates for deposing fiber tapes can be achieved.

According to an embodiment the tool system further comprises a fiber placement device for laying down fiber tapes onto the receiving surface formed by the first surface region of the tool surface and the support surface in the starting position of the support component. Thereby, an AFP process may be performed for laying down fiber tapes on receiving surface.

With respect to directions and axes, in particular with respect to directions and axes concerning the extent of physical structures, within the scope of the present disclosure, an extent of an axis, a direction, or a structure "along" another axis, direction, or structure includes in particular that the axes, directions, or structures, in particular tangents which result at a particular site of the respective structures, enclose an angle which is smaller than 45 degrees, for example smaller than 30 degrees and for example extend parallel to each other.

With respect to directions and axes, in particular with respect to directions and axes concerning the extent of physical structures, within the scope of the present disclosure, an extent of an axis, a direction, or a structure "crossways", "across", "cross", or "transversal" to another axis, direction, or structure includes in particular that the axes, directions, or structures, in particular tangents which result at a particular site of the respective structures, enclose an angle which is greater or equal than 45 degrees, for example greater or equal than 60 degrees, and for example extend perpendicular to each other.

Within the scope of the present disclosure, a "fiber material" may include a material comprising a plurality of reinforcing fibers, in particular fillet like or fillet member like fibers, for example carbon fibers, glass fibers, ceramic fibers, aramid fibers, boron fibers, mineral fibers, organic fibers, or plastic fibers or mixtures thereof.

BRIEF DESCRIPTION OF THE DRAWINGS

The disclosure herein will be explained in greater detail with reference to example embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

Figure 1:
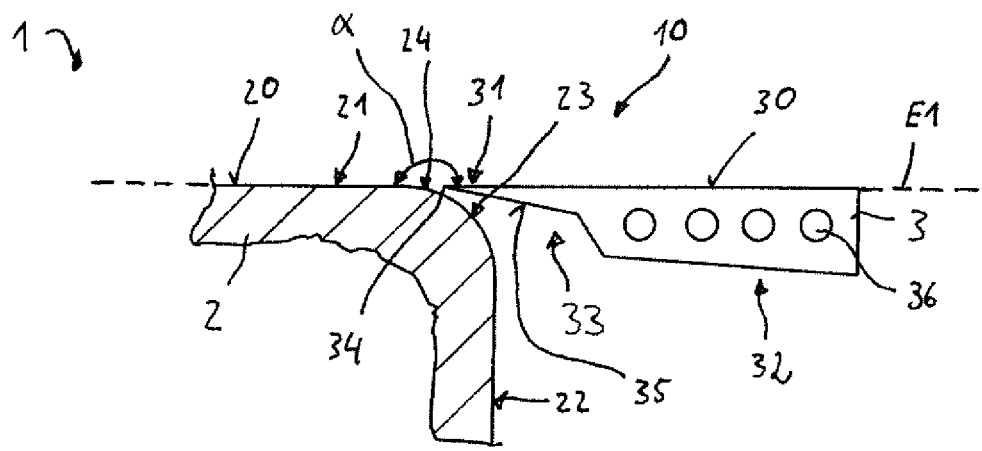
FIG. 1 schematically illustrates a sectional view of a tool system according to an embodiment of the disclosure herein and a first step of a method according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Figure 4:
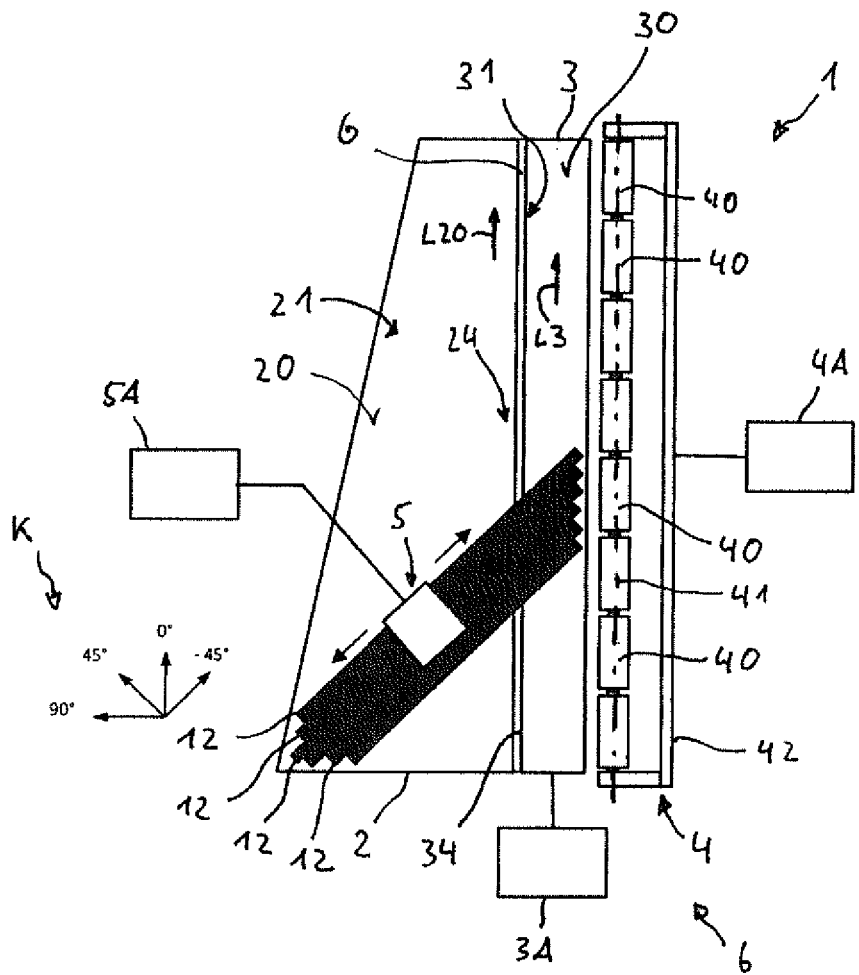
FIG. 4 schematically illustrates a plan view of a tool system according to an embodiment of the disclosure herein and the step of the method shown in FIG. 2 as a plan view.

FIG. 1 shows a sectional view of a tool system 1 during a first step of a method. The tool system 1 is further shown in FIG. 4 as a plan view. As shown in FIGS. 1 and 4, the tool system 1 comprises a forming tool component 2 and a support component 3. As shown in particular in FIG. 4, the tool system 1 further comprises a roller device 4, an optional fiber placement device 5, and a kinematic system 6 including a first moving device 3A for guiding or moving the support component 3, a second moving device 4A for positioning and guiding or moving the roller device 4, and an optional deposition moving device 5A for guiding or moving the optional fiber placement device 5.

As shown in FIG. 1, the forming tool component 2 comprises a contoured tool surface 20. The contoured tool surface 20 includes a first surface region 21, a second surface region 22, a transition region 23. The transition region 23 connects or extends between the first and the second surface region 21, 22. In FIG. 1, the first surface region 21 and the second surface region 22 are exemplarily shown as flat or even surfaces. The second surface 22 extends transversal to the first surface 21 and the transition region 23 extends between the first and the second surface region 21, 22 in a curved shape. FIG. 1 exemplarily shows the transition region 23 to form a convex shape. As is shown in FIG. 4, the tool surface 20 comprises an areal expanse and extends in a longitudinal direction L20. The first surface region 21 of the tool surface 20 comprises an end section 24 lying adjacent to the transition region 23 and extending from the transition region 23 transversal to the longitudinal direction L20.

As is shown in FIGS. 1 and 4, the support component 3 comprises a support surface 30 which is exemplarily shown as a flat or even surface. As is exemplarily shown in FIG. 1, the support component 3 comprises a base section 32 and a front section 33. The front section 33 may in particular comprise a wedge-shaped cross-sectional shape, as is exemplarily shown in FIG. 1. A front edge 34 of the support part is defined by a front end region 31 of the support surface 30 and a lower surface 35 facing away from the front end region of the support surface 30. The front edge 34 of the support part defines a support part longitudinal direction L3. The front section 33 of the support part 3 includes a front end region 31 of the support surface 30. The front end region 31 of the support surface 30 extends from the front edge 34 transversal to the support part longitudinal direction L3. As is shown in particular in FIG. 4, the support surface 30 further comprises an areal expanse along the support part longitudinal direction L3. The base section 32 of the support component 3 may comprise a substantially rectangular or trapezoidal cross-sectional shape as is exemplarily shown in FIG. 1. As is shown further in FIG. 1, the base section may comprise channels 36 extending within the cross-section of the base section 32 of the support component 3 along the support part longitudinal direction L3.

The first moving device 3A in FIG. 4 is only schematically shown as a functional block. The first moving device 3A may for example be formed by a manipulator of a robot or similar. The first moving device 3A is provided for moving the support component 3 relative to the forming tool component 2 between a starting position shown in FIG. 1 and an end position.

FIGS. 1 through 4 exemplarily show the starting position of the support component 3. In the starting position the front end region 31 of the support surface 30 of the support component 3 extends along an end section 24 of the first surface region 21 of the tool surface 20. In particular, the front edge 34 of the support component 3 is positioned facing towards the first surface region 21 of the tool surface 20. As is shown in FIG. 4, the longitudinal direction L20 of the tool surface 20 and the support part longitudinal direction L3 extend along each other. As is shown in FIGS. 1 through 4, a small gap G may be formed between the front edge 34 of the support component 3 and the tool surface 20 in the starting position of the support component 3. The wedge-shaped cross-section of the front section 33 of the support component 3 allows to keep this gap G small. In the starting position, the first surface region 21 of the tool surface 20 and the support surface 30 form a receiving surface 10.

As is shown exemplarily in FIG. 1, in the starting position, the front end region 31 of the support surface 30 of the support component 3 and the end section 24 of the first surface region 21 of the tool surface 20 may be positioned in a common plane E1. In FIG. 1, the first surface region 21 and the support surface 30 exemplarily form the plane E1. Generally, the front end region 31 of the support surface 30 of the support component 3 and the end section 24 of the first surface region 21 of the tool surface 20 in the starting position of the support component 30 confine an angle α which may in particular lie in the range between 150 degree and 210 degree. In FIG. 1, the angle α between the he end section 24 of the first surface region 21 of the tool surface 20 and the front end region 31 of the support surface 30 is 180 degree.

The first moving device 3A is configured to move the support component 3 with its front edge 34 along the transition region 23 and the second surface region 22 of the tool surface 20 to an end position in which the front end region 31 of the support surface 30 of the support component 3 extends along the second surface region 22 of the tool surface 20. The course of movement of the support component 3 will be described in more detail below.

Figure 3:
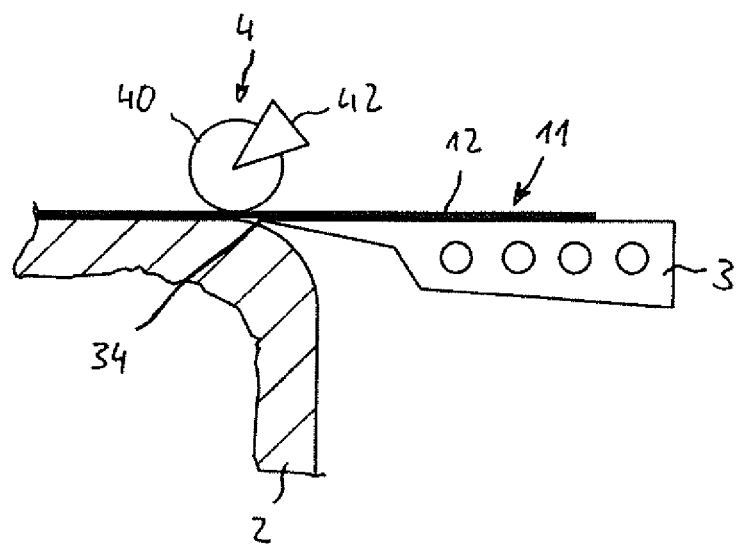
FIG. 3 schematically illustrates a further step of the method according to an embodiment of the disclosure herein.
Figure 5:
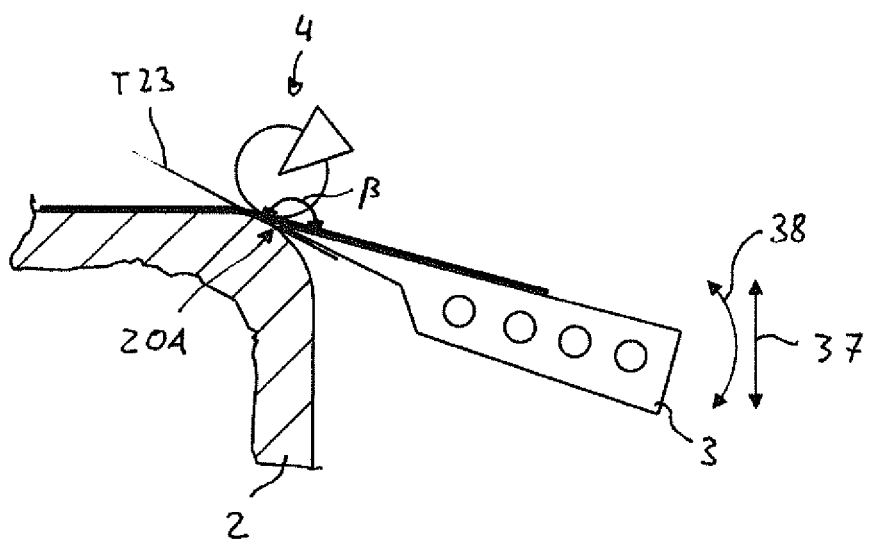
FIG. 5 schematically illustrates a further step of the method according to an embodiment of the disclosure herein.
Figure 6:
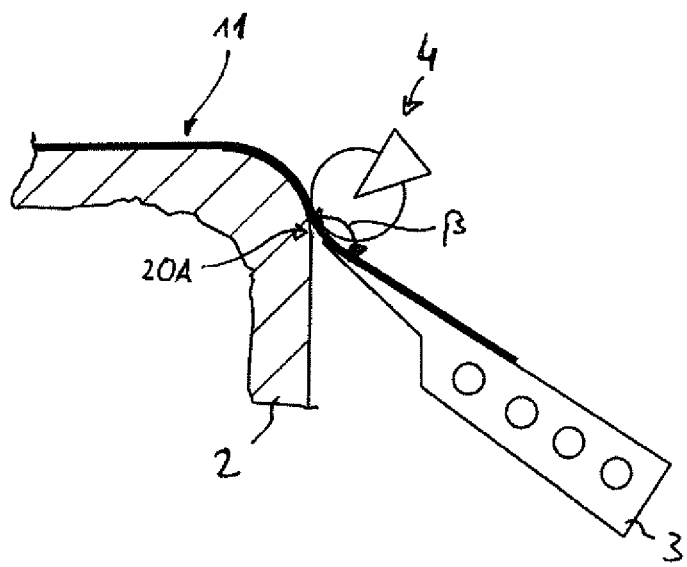
FIG. 6 schematically illustrates performing further the step of the method shown in FIG. 5.

The roller device 4 is shown in more detail in FIG. 4. The roller device 4 in particular may comprise a plurality of rollers 40 arranged adjacent to one another. As exemplarily shown in FIG. 4, the rollers 40 may comprise a common pivot axis 41. The roller device 4 further may comprise a frame 42 which holds the plurality of rollers 40. As shown in FIGS. 3, 5, and 6, the rollers 40 may comprise a circle shaped cross-section. Further, the rollers may comprise a coating (not shown) of an elastic material, for example rubber or such like.

The second moving device 4A in FIG. 4 is shown in FIG. 4 only in a schematic manner as a functional block. The second moving device 4A may for example be formed by a manipulator of a robot or similar. The second moving device 4A is provided for moving the roller device 4 relative to the forming tool component 2. In particular, the second moving device 4A is configured to position the roller device 4 in a predefined distance to the tool surface 20 so as to press a fiber layer 11 against the tool surface 20 by the rollers 40 as is exemplarily shown in FIG. 3. Further, the second moving device 4A is configured to move the roller device 4 along the tool surface 20 synchronously with the support component 3 as will be described in more detail below.

Figure 2:
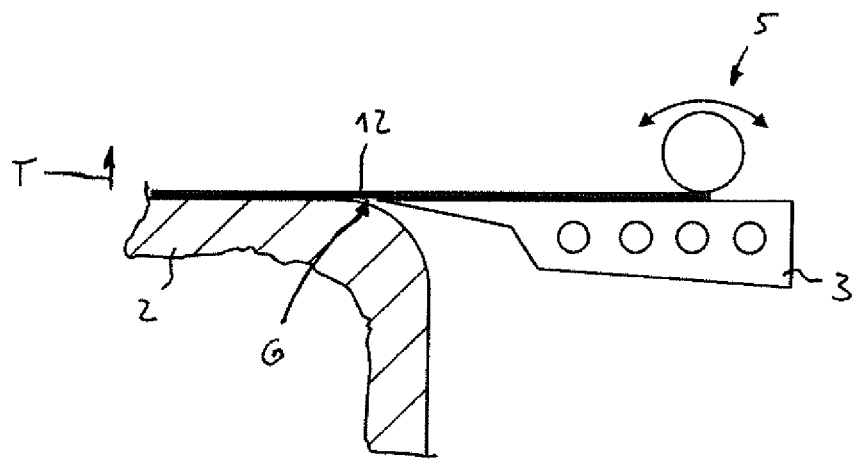
FIG. 2 schematically illustrates a further step of the method according to an embodiment of the disclosure herein.
Figure 7:
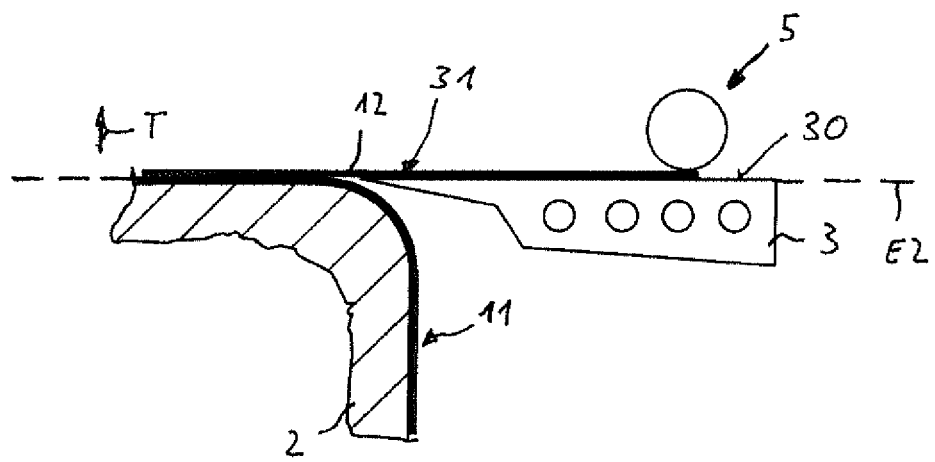
FIG. 7 schematically illustrates a further step of the method according to an embodiment of the disclosure herein.

In FIGS. 2, 4 and 7, the optional fiber placement device 5 is schematically illustrated. The fiber placement device 5 is provided for laying down fiber tapes onto the receiving surface 10 formed by the first surface region 21 of the tool surface 20 and the support surface 31 in the starting position of the support component 30. A deposition moving device 5A is provided for moving the fiber placement device 5. The deposition moving device 5A in FIG. 4 is shown in FIG. 4 only in a schematic manner as a functional block and may for example be formed by a manipulator of a robot or similar. The fiber placement device 5 may in particular be formed by an automatic fiber placement, AFP, machine. AFP machines are commonly used for laying down fiber tapes and detailed description is therefore omitted.

In the following, a method for manufacturing a multilayer fiber structure F will be described, wherein reference is made to the tool system 1 described above.

In a first step of the method shown exemplarily in FIG. 1, the receiving surface 10 is provided by positioning the support component 3 in the starting position. As is exemplarily shown in FIG. 1, thereby the receiving surface 10 may be provided as a flat or planar surface, in particular, the receiving surface 30 and the first surface region 21 of the tool surface 20 may lie within a common plane E1. As is further shown in FIG. 1, the front end region 31 of the support surface 30 extends over the curved transition region 23 of the tool surface 20.

In a further step shown exemplarily in FIGS. 2 and 4, a plurality of fiber tapes 12 are laid down onto the receiving surface so as to form a fiber layer 11 by the deposition device 5, in particular in an AFP process. As is shown in FIG. 4, the fiber tapes 12 are deposed adjacent to one another one another on the receiving surface 10. However, the fiber tapes 12 may also be deposed overlapping one another. As is shown exemplarily in FIG. 4, the fiber tapes 12 comprise a longitudinal expanse and may for example be laid down such that they extend oblique with respect to the longitudinal direction L20. The fiber tapes 12 shown in FIG. 4 are laid down in −45 degree lay down direction, which is illustrated by the coordinate system K shown in FIG. 4. The coordinate system show further exemplary lay down directions, in particular 0 degree, that is that the tapes 12 extend along the longitudinal direction L20, 45 degree and 90 degree. For example, in adjacent layers 11, the tapes 12 may comprises different orientation. Since the receiving surface 10 does not comprise any sharp radii of curvature, the fiber tapes 12 can be laid down with high deposition velocity, for example by the fiber placement device 5 in the form of an AFP machine. FIGS. 1 and 4 exemplarily show forming of one single fiber layer 11. However, it would also be possible to form more than one fiber layers stacked above one another in a thickness direction T.

In a further step, the roller device 4 is positioned in the end section 24 of the first surface region 21 of the tool surface 20 and press the fiber layer 11 against the tool surface 20. For example, positioning of the roller device may include rolling the rollers 40 of the roller device 4 over the section of the surface layer 11 being arranged on the first surface region 21 of the tool surface 20 towards the end section 24 of the first surface region 21 of the tool surface 20. As is shown in FIG. 3, the roller device 4, in particular rollers 40 are positioned close to the front edge 34 of the support component 3.

FIGS. 5 and 6 show a further step of the method which includes synchronously moving the front end region 31 of the support surface 30 of the support component 3 and the roller device 4 along the transition region 23 and the second surface region 22 of the tool surface 20. As is shown in FIGS. 5 and 6, the support component 3 is moved with its front edge 34 away from the first surface region 21, along the curvature of the curved transition region 23 and along the second surface region 22 of the tool surface 20. The roller device 4 is guided such that it follows the movement of the front edge 34 of the support component 3, for example at a constant distance. Thereby, the rollers 40 of the roller device 4 continuously pull the fiber layer 11 from the support surface 30 and continuously abut the fiber layer 11 against the transition region 23 and the second surface region 22 of the tool surface 20. In particular, thereby a combined lay down and forming step is performed. Since the support component 3 helps to provide a substantially even receiving surface 10, the fiber layers 11 can be laid down in a very fast and efficient manner, for example by an AFP process. Individually forming of each tape 12 of the respective fiber layer 11 can be omitted since one or more layers as a whole are formed by the support component 3 and the roller device 4 which are moved as described above. Hence, the method comprises an improved efficiency. Further, the number of fiber layers 11 which are formed to the shape of the tool surface 20 in one step may be varied, for example depending on the orientation of the tapes 12 forming the respective layers 11.

As is shown exemplarily in FIGS. 5 and 6, the support component 3 may be tilted towards the second surface region 22 of the tool surface 20 while being moved from its starting position towards its end position. Thereby, the support component 3 performs a combined transversal-rotational movement, as is schematically illustrated in FIG. 5 by the arrows 37, 38.

Further, in FIG. 5 an angle β is sketched between the front end region 31 of the support surface 30 and an actual surface section 20A of the tool surface 20. The actual surface section 20A may be defined as a virtual line or stripe of the tool surface which lies in a shortest possible distance to the front edge 34 of the support component 3. The angle β in particular is confined between a tangent T23 to the actual surface section 20A and a tangent (not shown) to the front end region 31 of the support surface 30. The angle β may in particular be greater or equal than 100 degree during moving the front end region of the support surface 30 along the transition region 23 and the second surface region 22 of the tool surface 20. Thereby, sharp bending of the fiber tapes 12 of the fiber layer 11 is avoided during movement transfer of the fiber layer 11 from the support surface 30 to the tool surface 20.

As described above, one or more fiber layers 11 may be formed on the receiving surface 10 in the starting position of the support component 3. In FIGS. 2 through 6, it is exemplarily shown to form only one single fiber layer 11 which is subsequently bent over and transferred to the transition region 23 and to the second surface region 22 of the tool surface 20. However, generally, further fiber layers 11 may be formed upon the fiber layers 11 already abutted to the tool surface 20. This is shown exemplarily in FIG. 7. The support component 3 is positioned in its starting position again. In particular, the support component 3 may be positioned such that the support surface 30, in particular the front end region 31 of the support surface 30 lies in a common plane E2 with a surface of the one or more previously formed fiber layers 11. As is shown in FIG. 7, the further fiber layers 11 may be laid down onto the previously formed fiber layers 11 and the support surface 30 in the same manner as described above. Also the further steps of the method may be performed in the same manner as described above.

Figure 8:
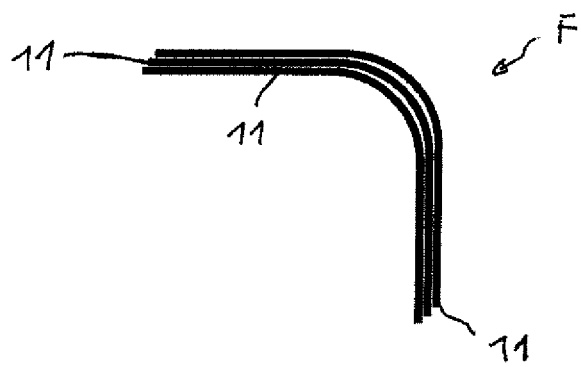
FIG. 8 schematically illustrates a multilayer fiber structure produced by a method according to an embodiment of the disclosure herein.

FIG. 8 exemplarily shows a multilayer fiber structure F which has been formed by the method described above. The multilayer fiber structure F comprises a plurality of shapes and a cross-sectional shape which corresponds to the contour defined by the tool surface 20.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool system for manufacturing a multilayer fiber structure, comprising:
   a forming tool component comprising a contoured tool surface which includes a first surface region and a second surface region, wherein the first surface region is connected to the second surface region by a curved transition region;
   a support component comprising a support surface; and
   a roller device;
   wherein the support component is movable along the tool surface of the forming tool component by a first moving device between a starting position, in which a front end region of the support surface of the support component extends along an end section of the first surface region of the tool surface lying adjacent to the transition region, and an end position in which the front end region of the support surface of the support component extends along the second surface region of the tool surface;
   wherein the roller device by a second moving device is positionable in a predefined distance to the tool surface and movable along the tool surface synchronously with the support component; and
   wherein the support component comprises a wedge-shaped front section.

2. The tool system of claim 1, wherein the roller device comprises a plurality of rollers arranged adjacent to one another.

3. The tool system of claim 1, wherein the wedge-shaped front section includes the front-end region of the support surface.

4. The tool system of claim 1, wherein the support surface is planar.

5. The tool system of claim 1, further comprising:
   a fiber placement device for laying down fiber tapes onto a receiving surface formed by the first surface region of the tool surface and the support surface in the starting position of the support component.

* * * * *